(12) United States Patent  (10) Patent No.: US 7,843,080 B2
Jansen  (45) Date of Patent: Nov. 30, 2010

(54) COOLING SYSTEM AND WIND TURBINE INCORPORATING SAME

(75) Inventor: Patrick L. Jansen, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/463,569

(22) Filed: May 11, 2009

(65) Prior Publication Data

US 2010/0140952 A1    Jun. 10, 2010

(51) Int. Cl.
    *H20P 9/04* (2006.01)
(52) U.S. Cl. .......................... 290/55; 290/44
(58) Field of Classification Search ............ 310/64, 310/52; 290/44, 55, 54, 43; 415/4.2, 4.5, 415/3.1, 4.1
    See application file for complete search history.

(56) References Cited

U.S. PATENT DOCUMENTS

| | | | |
|---|---|---|---|
| 4,132,912 A | 1/1979 | Wright | |
| 4,140,433 A * | 2/1979 | Eckel | 415/209.1 |
| 4,348,604 A | 9/1982 | Thode | |
| 4,742,257 A | 5/1988 | Carpenter | |
| 4,908,538 A | 3/1990 | Geberth, Jr. | |
| 5,747,900 A | 5/1998 | Nakamura et al. | |
| 5,925,947 A | 7/1999 | Kajiwara et al. | |
| 6,139,275 A | 10/2000 | Noda et al. | |
| 6,246,134 B1 | 6/2001 | Berrong et al. | |
| 6,531,788 B2 * | 3/2003 | Robson | 290/43 |
| 6,655,907 B2 * | 12/2003 | Brock et al. | 415/4.2 |
| 6,720,685 B2 * | 4/2004 | Balas | 310/400 |
| 6,891,290 B2 | 5/2005 | Nagayama et al. | |
| 6,979,919 B2 * | 12/2005 | Gotmalm | 310/54 |
| 7,462,964 B2 | 12/2008 | Nagayama et al. | |
| 7,547,985 B2 * | 6/2009 | Takaichi et al. | 290/55 |
| 7,592,723 B2 * | 9/2009 | Mukai et al. | 310/68 D |
| 2004/0150270 A1 | 8/2004 | Nagayama et al. | |
| 2008/0036314 A1 | 2/2008 | Kanei et al. | |
| 2008/0106159 A1 | 5/2008 | Yoshida et al. | |
| 2008/0231126 A1 | 9/2008 | Telore et al. | |

FOREIGN PATENT DOCUMENTS

| JP | 08009594 A2 | 1/1996 |
|---|---|---|
| JP | 2000116059 A2 | 4/2000 |

\* cited by examiner

*Primary Examiner*—J Gon
*Assistant Examiner*—Iraj A Mohandesi
(74) *Attorney, Agent, or Firm*—James W. Pemrick; Ernest G. Cusick; Frank A. Landgraff

(57) ABSTRACT

A cooling system for a wind turbine is provided. The cooling system includes at least one generator having a plurality of external fins disposed around at least a portion of the periphery of the generator. A shroud is disposed around at least a portion of the generator, and is configured to guide air across the external fins so that said air cools the generator.

19 Claims, 9 Drawing Sheets

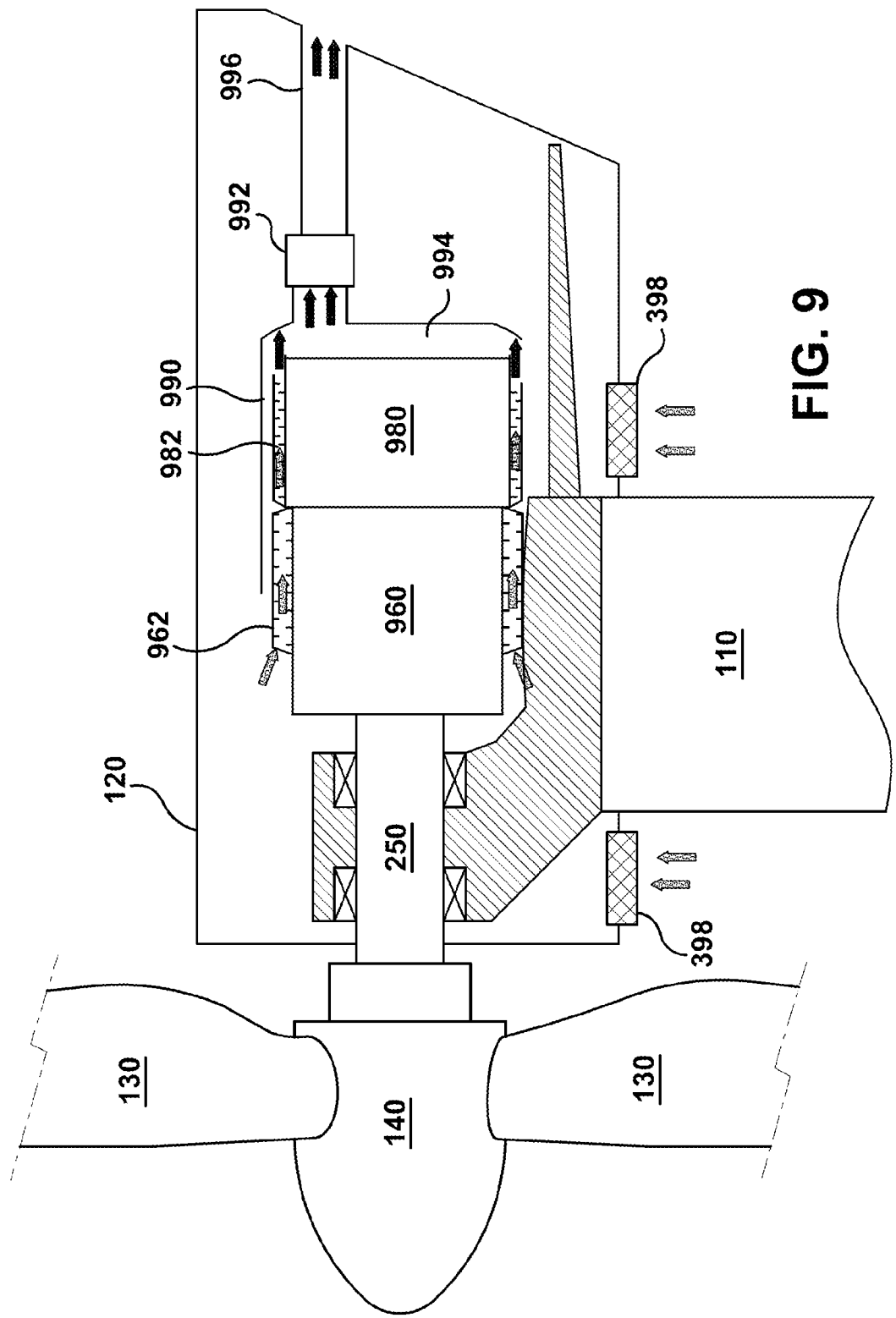

COOLING SYSTEM AND WIND TURBINE INCORPORATING SAME

BACKGROUND OF THE INVENTION

The system described herein relates generally to an improved cooling system. More specifically, the system relates to an improved cooling system for a generator and/or gearbox in a wind turbine.

Recently, wind turbines have received increased attention as environmentally safe and relatively inexpensive alternative energy sources. Wind turbines do not emit greenhouse gases (GHGs), and therefore, do not contribute to global warming. With the growing interest in wind generated electricity, considerable efforts have been made to develop wind turbines that are reliable and efficient.

Wind is usually considered to be a form of solar energy caused by uneven heating of the atmosphere by the sun, irregularities of the earth's surface, and rotation of the earth. Wind flow patterns are modified by the earth's terrain, bodies of water, and vegetation. The terms wind energy or wind power, describe the process by which the wind is used to rotate a shaft and subsequently generate mechanical power or electricity.

Typically, wind turbines are used to convert the kinetic energy in the wind into mechanical power. This mechanical power may be used for specific tasks (such as grinding grain or pumping water) or a generator may convert this mechanical power (i.e., the rotation of a shaft) into electricity. A wind turbine usually includes an aerodynamic mechanism (e.g., blades) for converting the movement of air into a mechanical motion (e.g., rotation), which is then converted with a generator into electrical power. Power output from the generator is proportional to the cube of the wind speed. As wind speed doubles, the capacity of wind generators increases almost eightfold.

The majority of commercially available wind turbines utilize geared drive trains to connect the turbine blades to the electrical generators. The wind turns the turbine blades, which spin a low speed shaft, which feeds into a gearbox having a higher speed output shaft. This higher speed output shaft connects to a generator which makes electricity. The geared drive aims to increase the velocity of the mechanical motion.

The industry standard drive train for large (e.g., >1 MW) wind turbines consists of discrete gearbox and generator units that are separately mounted to a mainframe (also commonly called a bedframe or bedplate). Power is transferred from the gearbox to the generator via a flexible "high-speed" shaft coupling. This arrangement forces the gearbox and generator to be physically distanced from each other, as well as, requires both the output shaft of the gearbox and the input shaft of the generator to be separately supported by gearbox bearings and generator bearings, respectively.

Heat exchangers are often used to dissipate the heat generated during operation of the generator and/or gearbox. Typically, a gearbox heat exchanger (e.g., oil to air) is connected to the gearbox and a generator heat exchanger (e.g., air to air) is mounted to a generator. These heat exchangers enable the generator (and/or gearbox) to be sealed from the environment, however, they are costly, heavy, and consume valuable power.

Conventional TEFC (totally-enclosed fan-cooled) and TEAO (totally-enclosed air-over) industrial motor cooling systems do not require heat exchangers to provide sealed systems, but arrangements blow cool inlet air from the motor non-drive end across external fins to the motor drive end. Both the inlet and exhausted air paths tend to be unducted, which would not be suitable for wind turbine applications where the nacelle is enclosed. Efficient and low-cost ducting of the external exhaust air path from the drive-end can be exceedingly difficult and would be especially challenging in wind turbine applications, and compact geared drive train configurations in particular, due to tight space and enclosure requirements enforced by the nacelle enclosure and bedplate.

BRIEF DESCRIPTION OF THE INVENTION

According to one aspect of the present invention, a cooling system for a wind turbine is provided. The cooling system includes at least one generator having a plurality of external fins disposed around at least a portion of the periphery of the generator. A shroud is disposed around at least a portion of the generator, and is configured to guide air across the external fins so that said air cools the generator.

According to another aspect of the present invention, a wind turbine having a cooling system is provided. The cooling system includes at least one generator having a plurality of external fins disposed around at least a portion of the periphery of the generator. A shroud is disposed around at least a portion of the generator, and is configured to guide air across the external fins so that said air cools the generator.

BRIEF DESCRIPTION OF THE DRAWINGS

FIG. 9 is a simplified, cross-sectional illustration of a portion of a wind turbine having a compact geared drive train and a cooling system according to another aspect of the present invention.

DETAILED DESCRIPTION OF THE INVENTION

Figure 1:
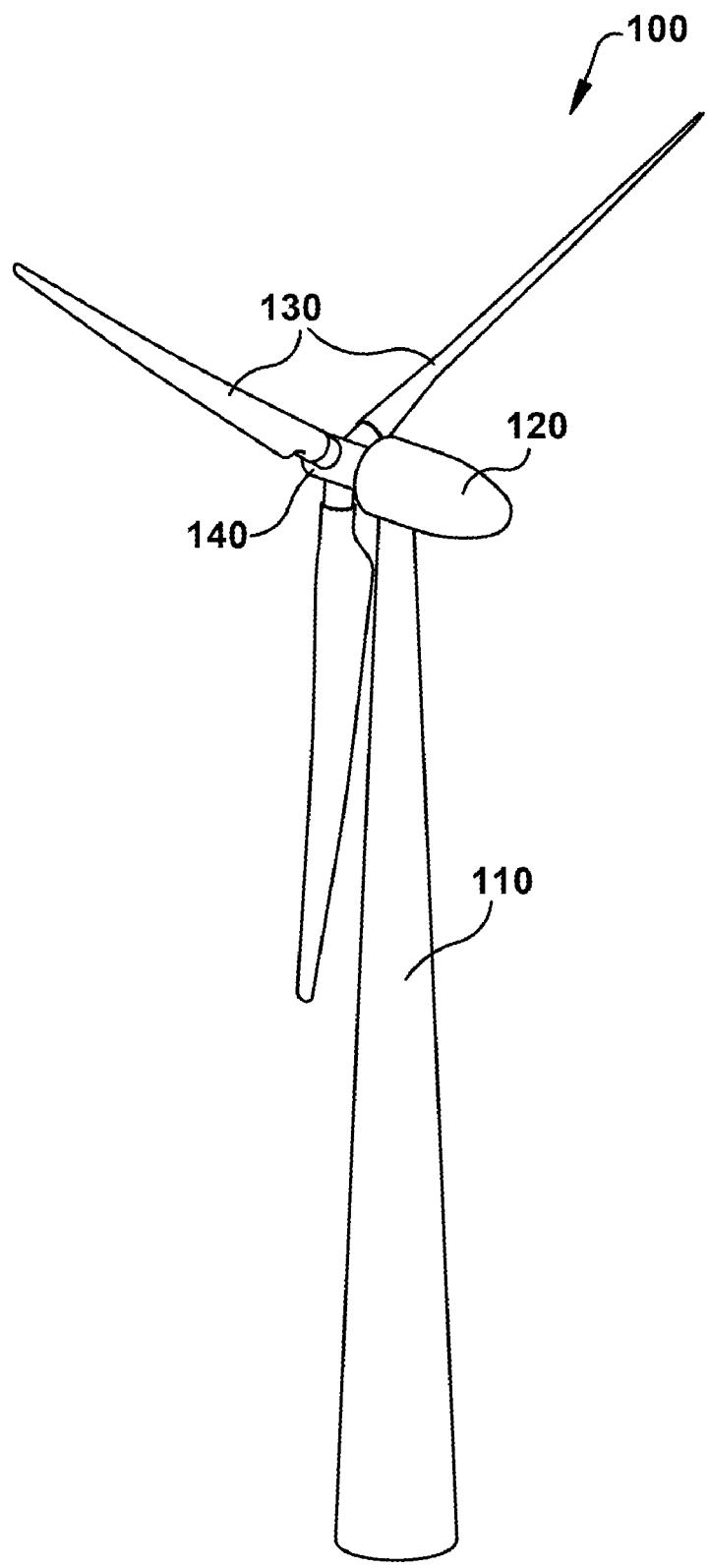
FIG. 1 is a perspective illustration of an exemplary wind turbine.

A typical commercial horizontal axis wind turbine (HAWT) 100 is illustrated in FIG. 1. The wind turbine 100 may include a tubular tower 110, which is often manufactured of steel. The tower 110 may be erected by stacking multiple tower segments on top of each other. The tower 110 supports the weight of the nacelle 120, blades 130 and hub 140. Towers may also be of the lattice (or truss) type, and tubular towers may alternatively be formed of concrete. The nacelle 120 typically houses the drive train (e.g., gearbox, shafts, couplings, generator, etc.), as well as the main frame (also called bedplate) and yaw drives. Other items such as the control electronics may be housed within the nacelle 120 as well. Typically, the nacelle 120 has an outer skin that is comprised of a lightweight material such as fiberglass or a graphite composite. The main function of the nacelle skin is to protect the contents from the elements (e.g., rain, ice, snow, etc.).

The blades 130 are connected to the hub 140, and the hub may contain a pitch control mechanism to control the pitch angle of each blade. Typically, three blades are employed in most commercial wind turbines, however, one, two or four or more blades could be employed as well. The blades convert the kinetic energy of the wind into mechanical energy by rotating a low speed shaft. Blades may be manufactured from fiberglass or graphite composites, fiberglass reinforced plastics or wood/epoxy laminates, or other suitable materials. The low speed shaft is connected to the hub 140 typically via a bolted flange coupling.

Generators are used to convert the rotation of a shaft into electrical energy. A gearbox is typically used to increase the speed of the input shaft to the generator. The gearbox has the low speed shaft as its input, and the output is a higher speed shaft, which according to aspects of the present invention, can feed directly into the generator.

Figure 2:
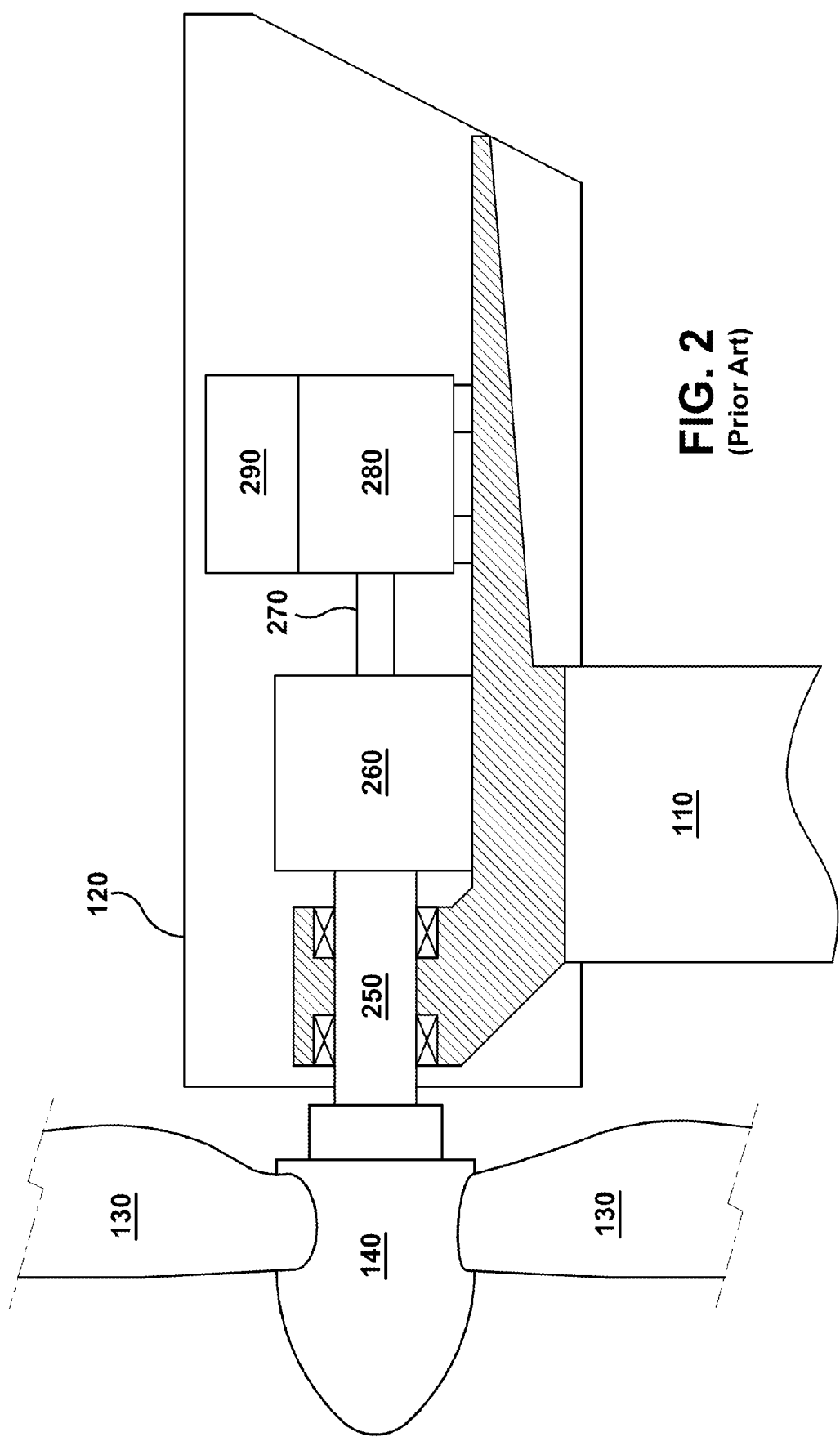
FIG. 2 is a simplified, cross-sectional illustration of a portion of one known wind turbine.

FIG. 2 illustrates a simplified, cross-sectional view of a portion of one known wind turbine. The nacelle 120 is mounted on tower 110. Blades 130 connect to hub 140, and drive a low-speed shaft 250 that is connected to gearbox 260. The gearbox drives a high-speed shaft 270, which is connected to generator 280. Typically, an air-to-air heat exchanger 290 is mounted on top of generator 280.

Figure 3:
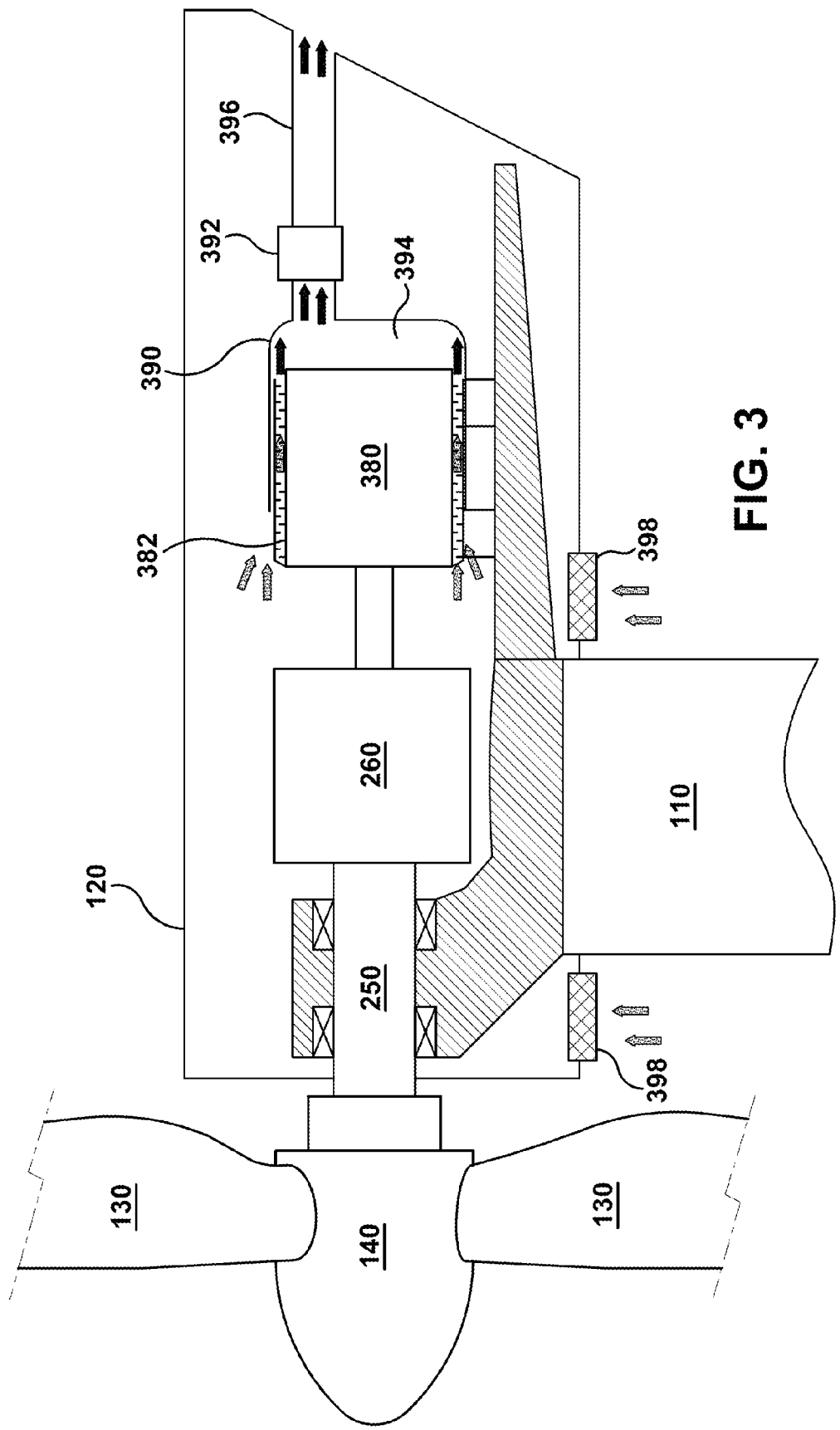
FIG. 3 is a simplified, cross-sectional illustration of a portion of a wind turbine having a cooling system according to an aspect of the present invention.

FIG. 3 illustrates a simplified, cross-sectional view of a portion of wind turbine 100 having an improved cooling system, according to one aspect of the present invention. The generator 380 has a plurality of external fins 382 disposed around the periphery of the outer housing of the generator. The external fins 382 act as heat exchange elements and assist in cooling the generator 380. A shroud 390 encompasses at least a portion of generator 380 and helps guide cooling ambient air, which may be drawn from within nacelle 120, across external fins 382. A fan or blower 392 creates a region of negative pressure in vacuity 394. Cooling air is drawn across external fins 382, into vacuity 394, passes through fan 392 and is forced out exhaust duct 396. In some applications, optional filters 398 may be used to filter air drawn into nacelle 120. The location of the air inlets are shown on the bottom of nacelle 120, but they can be located anywhere on the nacelle as desired for the specific application.

The generator 380 is preferably totally enclosed, and can be of any type including those currently used in the wind turbine industry, which include a permanent magnet (PM) synchronous, a wound-field synchronous, a doubly-fed asynchronous, and a squirrel-cage induction generator. As is common in industrial TEFC (totally-enclosed fan-cooled) and TEAO (totally-enclosed air-over) motors, an internal shaft mounted fan or paddle wheel can be used to circulate or stir the internal air to transfer heat from the generator rotor and the stator end windings to the generator frame and external fins 382. One key advantage provided by the system of the present invention is that the need for air-to-air heat exchangers (e.g., element 290 in FIG. 2) for a wind-turbine generator can be eliminated, while still meeting the IP54 (or better) generator enclosure requirements as in the common standard in the wind turbine industry. The IP code is defined by the International Engineering Consortium (IEC), and consists of the letters IP followed by two digits and an optional letter. For example, in the IP54 code, the "5" corresponds to equipment where the ingress of dust is not entirely prevented, but the dust does not enter in sufficient quantity to interfere with the satisfactory operation of the equipment, and where there is complete protection against contact. The "4" corresponds to protection from splashing water where water splashing against the enclosure from any direction will have no harmful effect.

Figure 4:
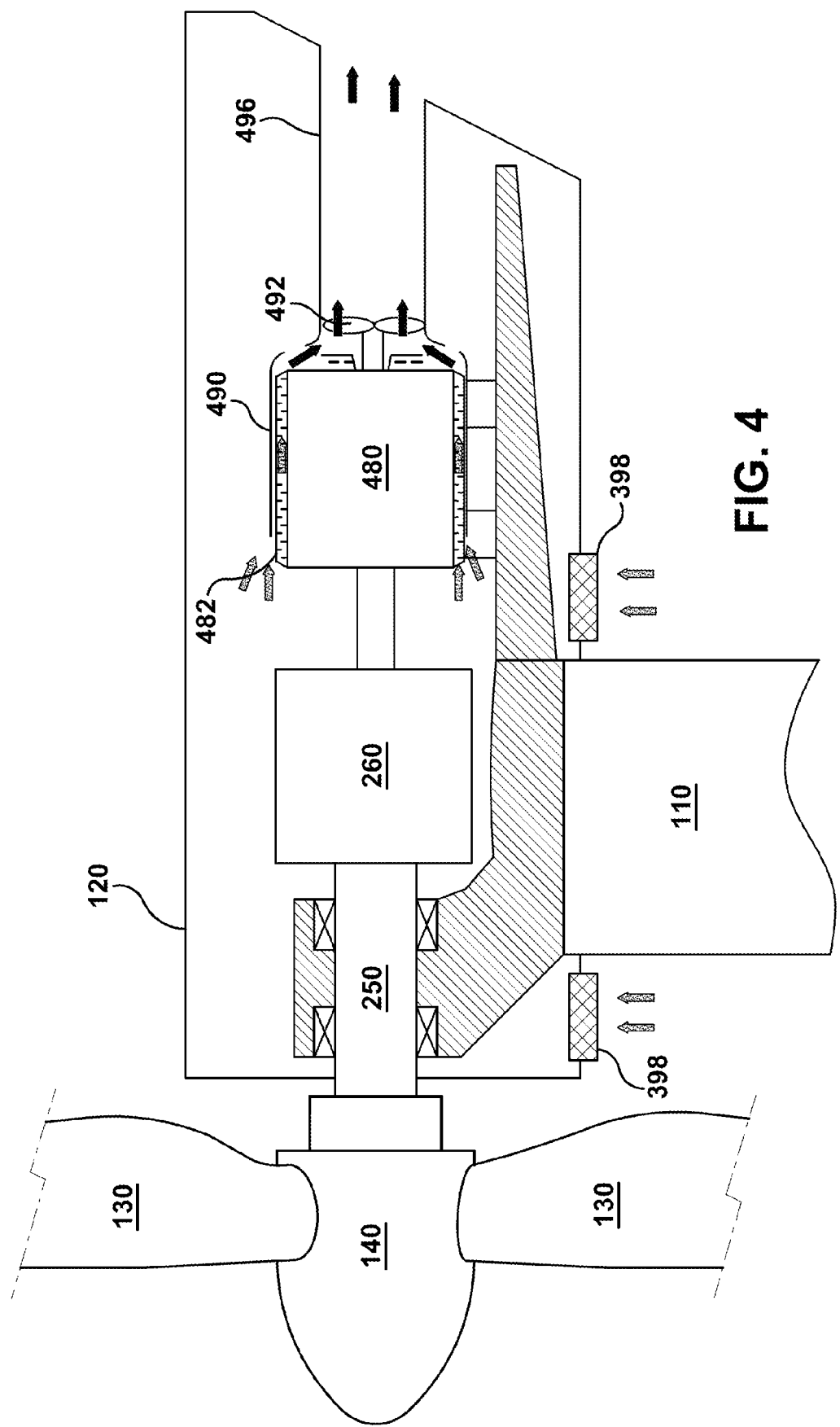
FIG. 4 is a simplified, cross-sectional illustration of a portion of a wind turbine having a cooling system according to another aspect of the present invention.

FIG. 4 illustrates a simplified, cross-sectional view of a portion of wind turbine 100 having an improved cooling system, according to another aspect of the present invention. The generator 480 has a plurality of external fins 482 disposed around the periphery of the outer housing of the generator. The back of the generator, or non-drive end, may also have external fins. The drive end of the generator is the side facing the gearbox 260. A shroud 490 encompasses at least a portion of generator 480 and helps guide cooling ambient air, which may be drawn from within nacelle 120, across external fins 482. A fan or blower 492 creates a region of negative pressure and draws cooling air across external fins 482. The heated air passes through fan 492 and is forced out exhaust duct 496. The fan can be mounted to the generator shaft or on a shaft driven by the generator rotor.

Figure 5:
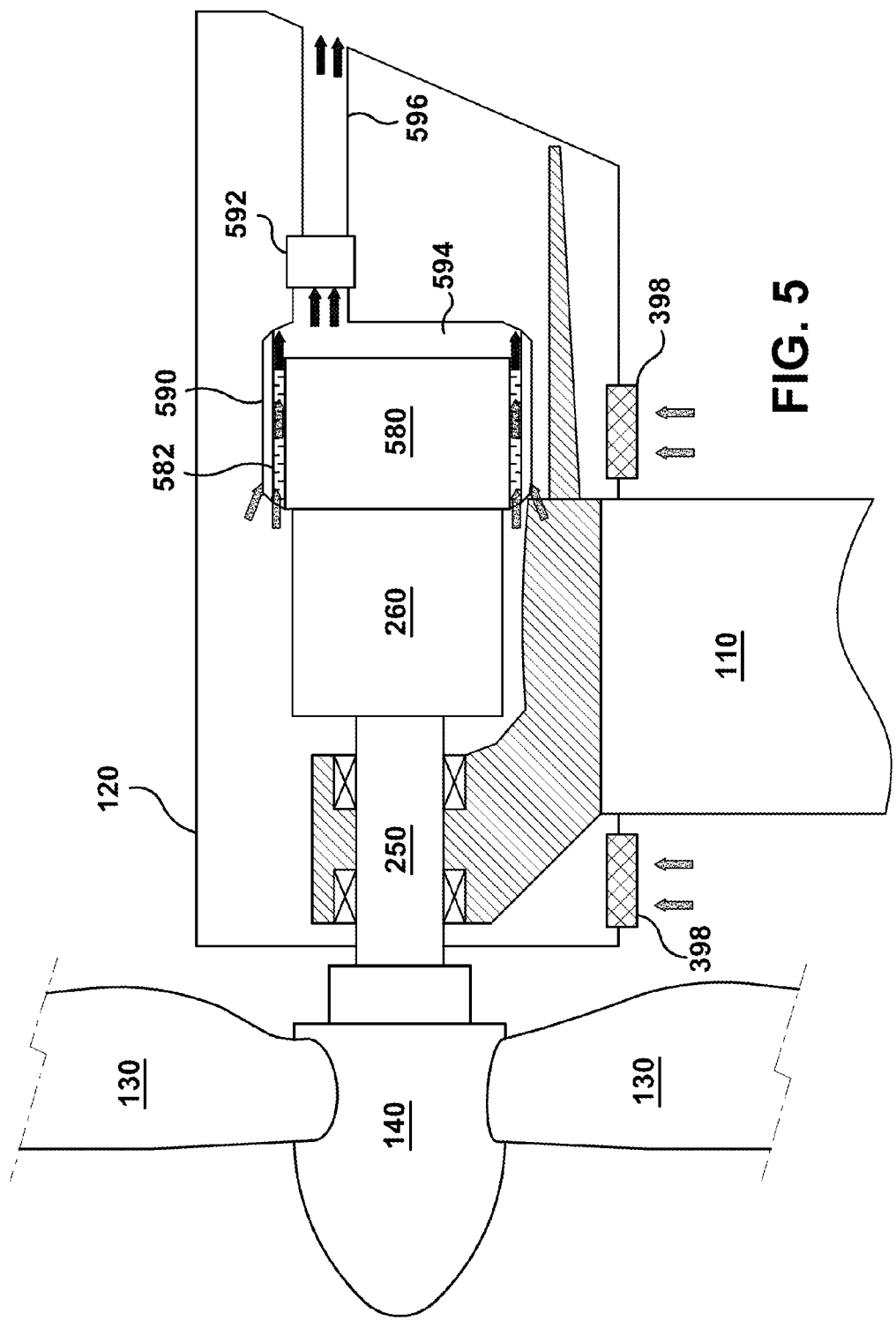
FIG. 5 is a simplified, cross-sectional illustration of a portion of a wind turbine having a compact geared drive train and a cooling system according to yet another aspect of the present invention.

FIG. 5 illustrates a simplified, cross-sectional view of a portion of wind turbine 100 having an improved cooling system, according to another aspect of the present invention. The gearbox 560 and generator 580 are configured into a compact geared drive train, where the generator is attached to the gearbox. The generator 580 has a plurality of external fins 582 disposed around the periphery of the outer housing of the generator. A shroud 590 encompasses at least a portion of generator 580 and helps guide cooling ambient air, which may be drawn from within nacelle 120, across external fins 582. A fan or blower 592 creates a region of negative pressure in vacuity 594. Cooling air is drawn across external fins 582, into vacuity 594, passes through fan 592 and is forced out exhaust duct 596.

Figure 6:
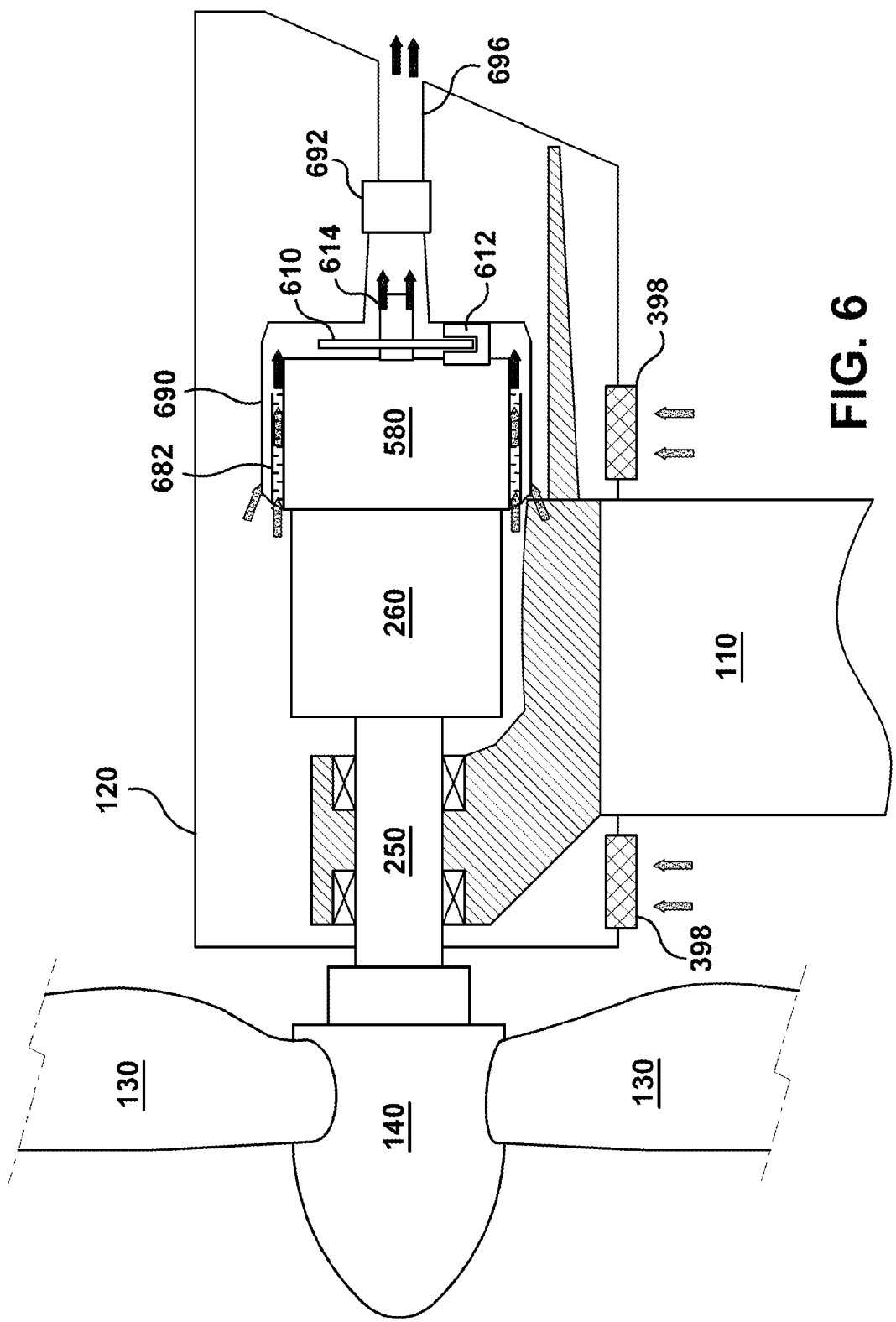
FIG. 6 is a simplified, cross-sectional illustration of a portion of a wind turbine having a compact geared drive train and a cooling system according to a still further aspect of the present invention.

FIG. 6 illustrates a simplified, cross-sectional view of a portion of wind turbine 100 having an improved cooling system, according to an aspect of the present invention. The gearbox 660 and generator 680 are configured into a compact geared drive train, and a brake disk 610 and brake caliper 612 are attached to a generator shaft 614. In addition, a slip ring assembly (not shown) may be mounted off of, or concentric with, the rotor shaft of the generator 680 and the brake disk 610. The generator 680 has a plurality of external fins 682 disposed around the periphery of the outer housing of the generator. A shroud 690 encompasses at least a portion of generator 680 and helps guide cooling ambient air, which may be drawn from within nacelle 120, across external fins 682. A fin or blower 692 draws cooling air across external fins 682. The heated air is then forced out exhaust duct 696.

The shroud 690 can also encompass all or a portion of the braking system 610, 612 and helps guide a portion of the cooling ambient air across brake disk 610 and brake caliper 612. This arrangement has the advantage of being able to cool the braking system during a braking operation.

Figure 7:
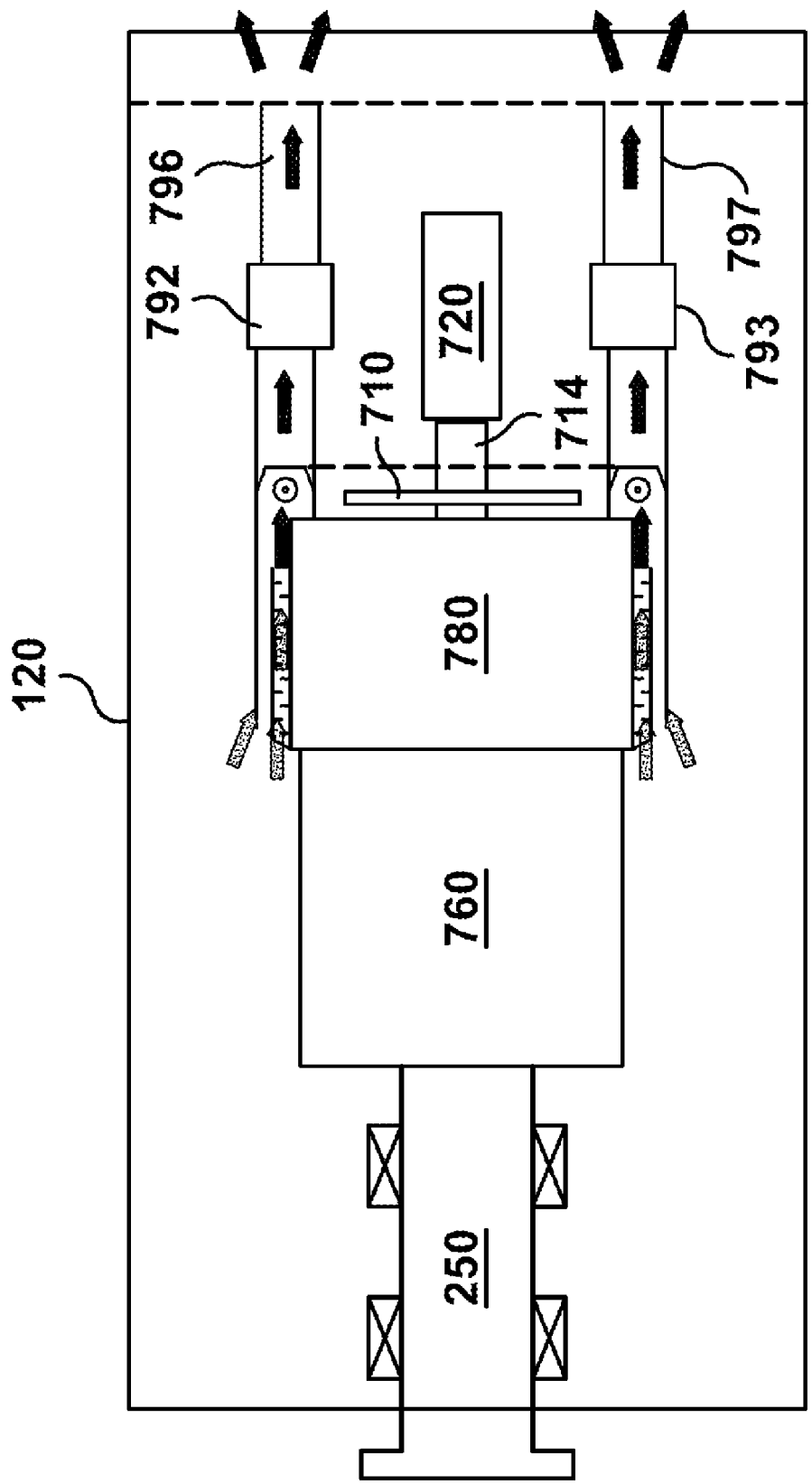
FIG. 7 is a simplified, top cross-sectional illustration of a portion of a wind turbine having a compact geared drive train and a cooling system according to another aspect of the present invention.

FIG. 7 illustrates a simplified top cross sectional view of a portion of wind turbine 100 having an improved cooling system according to an aspect of the present invention. The gearbox 760 and generator 780 are configured into a compact geared drive train, and a brake disk 710 is attached to a generator shaft 714. In addition, a slip ring assembly 720 is mounted off of, or concentric with, the rotor shaft of the generator 780 and the brake disk 710. The generator 780 has a plurality of external fins 782 disposed around the periphery of the outer housing of the generator. A shroud 790 encompasses at least a portion of generator 780 and helps guide cooling ambient air, which may be drawn from within nacelle 120, across external fins 782. A first fan or blower 792 draws cooling air across external fins 782, and then forces the heated air out exhaust duct 796. A second fan or blower 793 draws cooling air across external fins 782, and then forces the heated air out exhaust duct 797.

Figure 8:
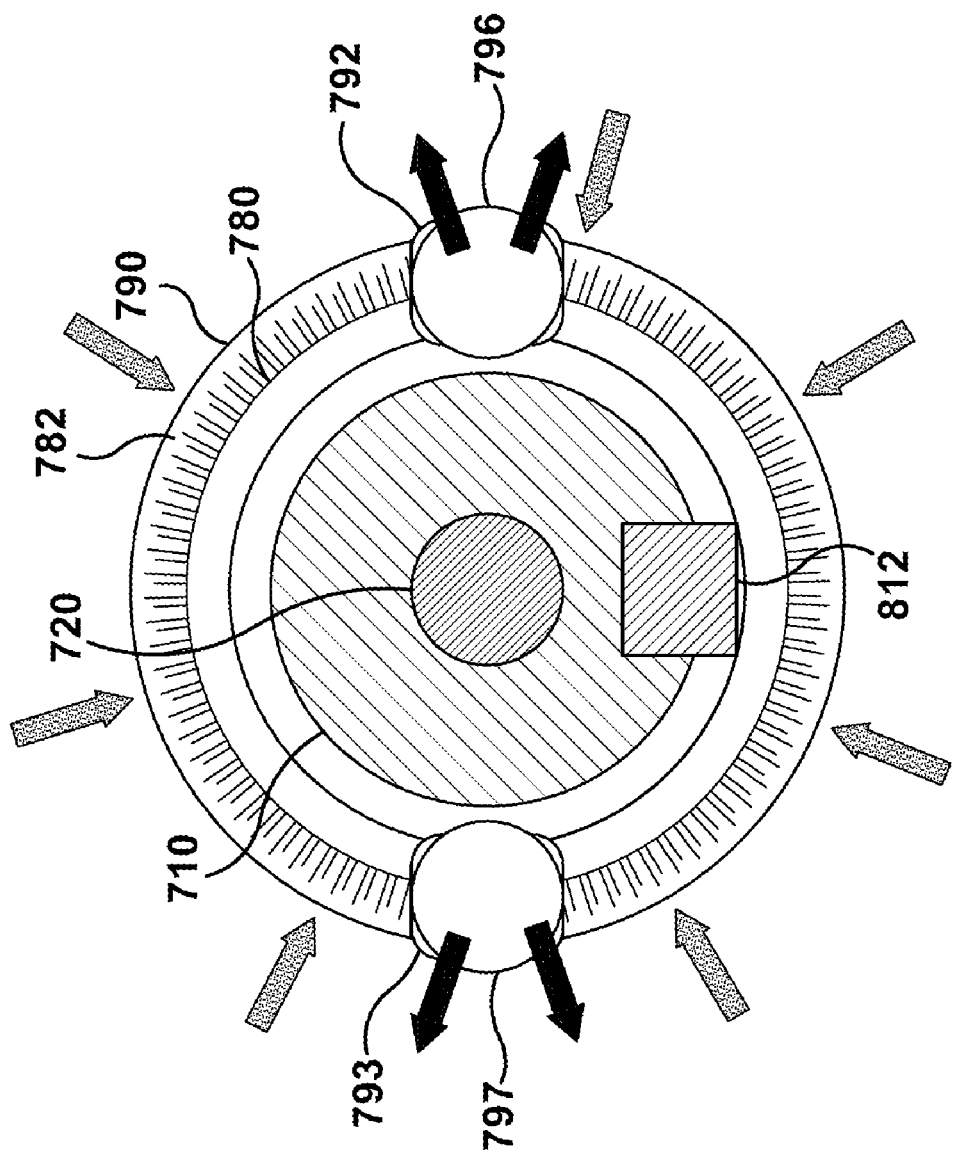
FIG. 8 is a simplified, end cross-sectional illustration of a portion of a wind turbine having a compact geared drive train and a cooling system according to yet another aspect of the present invention.

FIG. 8 illustrates a simplified end, cross sectional view of a portion of wind turbine 100 having an improved cooling system according to an aspect of the present invention. The generator 780 has a plurality of external fins 782 disposed around the periphery of the outer housing of the generator. A brake disk 710 is attached to the generator shaft. A slip ring assembly 720 is mounted off of, or concentric with, the rotor shaft of the generator 780 and the brake disk 710. A shroud 790 encompasses at least a portion of generator 780 and helps guide cooling ambient air, which may be drawn from within the nacelle, across external fins 782. A first fan or blower 792 draws cooling air across external fins 782, and then forces the heated air out exhaust duct 796. A second fan or blower 793 draws cooling air across external fins 782, and then forces the heated air out exhaust duct 797.

FIG. 9 illustrates a simplified, cross-sectional view of a portion of wind turbine 100 having an improved cooling system, according to an aspect of the present invention. The gearbox 960 and generator 980 are configured into a compact geared drive train, and the gearbox includes external cooling fins 962. A shroud 990 encompasses at least a portion of gearbox 960 and generator 980, and helps guide cooling ambient air, which may be drawn from within nacelle 120, across external fins 962 and 982. A fan or blower 992 creates a region of negative pressure in vacuity 794. Cooling air is drawn across external fins 962, 982, into vacuity 994, passes through fan 992 and is forced out exhaust duct 996. This arrangement has the advantage of being able to cool the generator and, at least partially, the gearbox.

One preferred generator type is a PM synchronous generator, but induction generators, wound-field synchronous generators, or doubly-fed asynchronous generators could be used as well. A wind turbine employing a single generator has been described, but it is to be understood that multiple generators could also be used with modifications to the gearbox and shroud.

The present invention provides an improved cooling system for a wind turbine generator and/or gearbox. A totally-enclosed generator can be employed, and the need for air-to-air heat exchangers or liquid cooling used in current known wind turbine generator(s) is eliminated, as well as, obtaining a reduction in cost, cooling power consumption, complexity and up-tower weight. One unique aspect of the present invention is that the flow of cooling air is from the drive-end to the non-drive end of the generator. This arrangement results in an efficient and simplified flow path for cooling air ideal for wind turbine applications. Heat created by the generator (and optionally the gearbox) can be immediately exhausted out the rear of the nacelle via simple and inexpensive ductwork, thereby avoiding unwanted heating of the internal nacelle. Furthermore, the inlet air to the generator does not require ducting or special treatment of the air, resulting in overall significantly reduced fan or blower power size, cost and consumption compared to existing systems.

While various embodiments are described herein, it will be appreciated from the specification that various combinations of elements, variations or improvements therein may be made, and are within the scope of the invention.

What is claimed is:

1. A cooling system for a wind turbine, comprising:
   at least one generator having a plurality of external fins disposed around at least a portion of the periphery of said at least one generator, the plurality of external fins connected to the at least one generator;
   a shroud disposed around at least a portion of said at least one generator and at least a portion of the plurality of external fins;
   at least one fan in fluid communication with said shroud, said at least one fan operative to create a suction to draw air into said shroud and across said plurality of external fins;
   a housing of the at least one generator connected to a housing of a gearbox and a compact geared drive train is formed by the at least one generator and the gearbox;
   a braking system connected to a shaft of said at least one generator, said shroud enveloping at least a portion of said braking system; and
   wherein said shroud is configured to guide air across at least a portion of said plurality of external fins so that said air cools said at least one generator.

2. The cooling system of claim 1, further comprising:
   at least one exhaust duct connected between said at least one fan and an exterior of a nacelle of said wind turbine.

3. The cooling system of claim 1, further comprising:
   at least two fans in fluid communication with said shroud, said at least two fans operative to create a suction to draw air into said shroud and across said plurality of external fins; and
   at least two exhaust ducts connected between said at least two fans and an exterior of a nacelle of said wind turbine.

4. The cooling system of claim 1, further comprising:
   said at least one fan connected to said generator, said at least one fan operative to create a suction to draw said air into said shroud and across said plurality of external fins.

5. The cooling system of claim 1, further comprising:
   a plurality of gearbox external fins disposed around at least a portion of the periphery of said gearbox;
   wherein at least a portion of said shroud is disposed around at least a portion of said gearbox.

6. The cooling system of claim 1, wherein said at least one generator is chosen from one or more of:
   permanent magnet generator, permanent magnet synchronous generator, induction generator, wound-field synchronous generator and doubly-fed asynchronous generator.

7. The cooling system of claim 1, further comprising:
   at least one vent in a nacelle of said wind turbine, said at least one vent comprising a filter to filter air entering said nacelle.

8. A wind turbine having a cooling system, said cooling system comprising:
   at least one generator having a plurality of external fins disposed around at least a portion of the periphery of said at least one generator, the plurality of external fins connected to the at least one generator;
   a shroud disposed around at least a portion of said at least one generator and at least a portion of the plurality of external fins;
   at least one fan in fluid communication with said shroud, said at least one fan operative to create a suction to draw air into said shroud and across said plurality of external fins;
   at least one vent in a nacelle of the wind turbine, the at least one vent comprising a filter to filter air entering the nacelle; and wherein said shroud is configured to guide air across at least a portion of said plurality of external fins so that said air cools said at least one generator.

9. The wind turbine of claim 8, further comprising:
at least one exhaust duct connected between said at least one fan and an exterior of a nacelle of said wind turbine.

10. The wind turbine of claim 8, further comprising:
at least two fans in fluid communication with said shroud, said at least two fans operative to create a suction to draw air into said shroud and across said plurality of external fans, and
at least two exhaust ducts connected between said at least two fans and an exterior of a nacelle of said wind turbine.

11. The wind turbine of claim 8, further comprising:
said at least one fan connected to said generator, said at least one fan operative to create a suction to draw said air into said shroud and across said plurality of external fins.

12. The wind turbine of claim 8, wherein a housing of said at least one generator is connected to a housing of a gearbox, and a compact geared drive train is formed by said at least one generator and said gearbox.

13. The wind turbine of claim 12, further comprising:
a braking system connected to a shaft of said at least one generator, said shroud enveloping at least a portion of said braking system.

14. The wind turbine of claim 12, further comprising:
a plurality of gearbox external fins disposed around at least a portion of the periphery of said gearbox;
wherein at least a portion of said shroud is disposed around at least a portion of said gearbox.

15. The wind turbine of claim 8, wherein said at least one generator is chosen from one or more of:
permanent magnet generator, permanent magnet synchronous generator, induction generator, wound-field synchronous generator and doubly-fed asynchronous generator.

16. A wind turbine having a cooling system, said cooling system comprising:
at least one generator having a plurality of external fins disposed around at least a portion of the periphery of the at least one generator, the plurality of external fins connected to the at least one generator;
a shroud disposed around at least a portion of the at least one generator and at least a portion of the plurality of external fins;
at least two fans in fluid communication with the shroud, the at least two fans operative to create a suction to draw air into the shroud and across the plurality of external fins;
at least two exhaust ducts connected between the at least two fans and an exterior of a nacelle of the wind turbine; and
wherein the shroud is configured to guide air across at least a portion of the plurality of external fins so that the air cools the at least one generator a braking system connected to a shaft of the at least one generator, the shroud enveloping at least a portion of the braking system; a plurality of gearbox external fins disposed around at least a portion of the periphery of the gearbox, wherein at least a portion of the shroud is disposed around at least a portion of the gearbox.

17. The wind turbine of claim 16, further comprising at least one vent in at least one of the nacelle and tower of the wind turbine, the at least one vent comprising a filter to filter air entering the at least one vent.

18. The wind turbine of claim 16, wherein a housing of the at least one generator is connected to a housing of a gearbox, and a compact geared drive train is formed by the at least one generator and the gearbox.

19. The wind turbine of claim 16, wherein the at least one generator is chosen from one or more of a:
permanent magnet generator, permanent magnet synchronous generator, induction generator, wound-field synchronous generator and doubly-fed asynchronous generator.

* * * * *